United States Patent
Cai et al.

(10) Patent No.: US 10,059,854 B2
(45) Date of Patent: Aug. 28, 2018

(54) COMPOSITION AND METHOD OF MAKING AQUEOUS PENETRATING INKJET INK

(71) Applicant: TROY GROUP, INC., Costa Mesa, CA (US)

(72) Inventors: Xiaorong Cai, Mount Pleasant, SC (US); Brian Lewis, Wheeling, WV (US); Chelsea Russell, Mannington, WV (US); Michael R. Riley, Steubenville, OH (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 14/978,677

(22) Filed: Dec. 22, 2015

(65) Prior Publication Data
US 2017/0174920 A1   Jun. 22, 2017

(51) Int. Cl.
| | |
|---|---|
| C09D 11/38 | (2014.01) |
| C09D 11/322 | (2014.01) |
| C09D 11/328 | (2014.01) |

(52) U.S. Cl.
CPC .......... *C09D 11/38* (2013.01); *C09D 11/322* (2013.01); *C09D 11/328* (2013.01)

(58) Field of Classification Search
CPC ........ C09D 11/32; C09D 11/40; C09D 11/324
See application file for complete search history.

(56) References Cited

U.S. PATENT DOCUMENTS

| | | | |
|---|---|---|---|
| 1,727,912 A | 9/1929 | Snyder | |
| 5,124,217 A | 6/1992 | Gruber et al. | |
| 5,135,569 A * | 8/1992 | Mathias | C09D 11/50 106/31.15 |
| 5,531,818 A * | 7/1996 | Lin | C09D 11/30 106/31.28 |
| 5,569,317 A * | 10/1996 | Sarada | C09D 11/50 347/100 |
| 5,681,381 A * | 10/1997 | Auslander | C09D 11/30 106/31.15 |
| 5,944,881 A * | 8/1999 | Mehta | C09D 11/50 106/31.15 |

(Continued)

FOREIGN PATENT DOCUMENTS

| | | |
|---|---|---|
| JP | 2002/226740 | 8/2002 |
| WO | WO 2003/057785 | 7/2003 |

OTHER PUBLICATIONS

PCT International Search Report and Written Opinion of the International Authority, US Patent Office, PCT Application No. PCT/US2016/48025, dated Nov. 2016, 9 pages.

*Primary Examiner* — Veronica F Faison

(57) ABSTRACT

An aqueous penetrating ink includes a pigment and a water-soluble dye. The ink also includes a humectant in which the water-soluble dye is to be at least partially dissolved. The humectant is present in the ink between 20 percent by weight and 70 percent by weight. This amount of humectant results in a slow evaporation rate. The ink also includes water, making it suitable for use with some inkjet printers. Because the pigment is not dissolved in the humectant or the water, it forms an image on the surface of a printed side of a substrate. The slow evaporation rate of the humectant allows it to carry the ink through a thickness of a substrate so that it is visible on a non-printed side of the substrate.

16 Claims, 2 Drawing Sheets

(56) References Cited

U.S. PATENT DOCUMENTS

| | | | | |
|---|---|---|---|---|
| 6,176,908 B1* | 1/2001 | Bauer | ................... | C09D 11/32 |
| | | | | 106/31.15 |
| 6,543,889 B2* | 4/2003 | Murcia | ................... | B41J 3/543 |
| | | | | 347/101 |
| 6,616,741 B1* | 9/2003 | Sawa | ................... | C09D 11/17 |
| | | | | 106/31.28 |
| 6,712,894 B2* | 3/2004 | Shepard | ................... | B41M 3/14 |
| | | | | 106/31.28 |
| 6,770,687 B1* | 8/2004 | Tan | ................... | B41M 3/148 |
| | | | | 106/31.14 |
| 7,220,524 B2 | 5/2007 | Heilman et al. | | |
| 9,141,009 B2 | 9/2015 | Hoefs et al. | | |
| 2003/0024434 A1* | 2/2003 | Butler | ................... | C09C 1/56 |
| | | | | 106/31.28 |
| 2004/0046846 A1 | 3/2004 | Pistagna et al. | | |
| 2004/0118320 A1* | 6/2004 | Akers | ................... | C09D 11/40 |
| | | | | 106/31.6 |
| 2005/0039633 A1* | 2/2005 | Aoyama | ................... | C09D 11/50 |
| | | | | 106/31.28 |
| 2005/0279249 A1* | 12/2005 | Auslander | ................... | C09D 5/22 |
| | | | | 106/31.32 |
| 2006/0012657 A1 | 1/2006 | Nagashima et al. | | |
| 2007/0236550 A1* | 10/2007 | Hoshi | ................... | C09D 11/30 |
| | | | | 347/100 |
| 2010/0024970 A1* | 2/2010 | Becvar | ................... | C09D 11/02 |
| | | | | 156/242 |
| 2010/0166959 A1 | 7/2010 | Auslander et al. | | |
| 2013/0261219 A1 | 10/2013 | Bogale et al. | | |
| 2013/0286081 A1* | 10/2013 | Sarkisian | ................... | C09D 11/328 |
| | | | | 347/20 |
| 2015/0158318 A1 | 6/2015 | Pawlik et al. | | |

\* cited by examiner

COMPOSITION AND METHOD OF MAKING AQUEOUS PENETRATING INKJET INK

BACKGROUND OF THE INVENTION

1. Field of the Invention

The present invention relates to compositions and methods of making security inks for use in inkjet printers.

2. Description of Related Art

As printing technology has advanced and printers became readily available to the public, more and more documents began to be printed on demand. The inherent value of some of these documents, such as personal checks, stocks, bank notes, wills, deeds and drug prescriptions, enticed counterfeiters to alter or duplicate them.

Most printing systems print by placing an ink or toner on a surface of a substrate where it stays and forms an image. Some inks and toners are relatively easy to remove from the substrate surface by scratching them off or by using solvents. These documents are easy targets for forgery.

Systems have been developed over the years to prevent this type of document alteration. For example, U.S. Pat. No. 1,727,912 to Snyder discloses a form of paper that can be used for protecting the integrity of information printed on it. The paper includes a coating with relatively low ink absorption properties and a body that readily absorbs the ink. A secure document is created by slitting or rupturing the coating during a writing process so that the ink penetrates into the absorbent body of the paper. Once the ink has been absorbed, it is difficult to remove. This specialized paper is expensive due to the materials and manufacturing methods required to make it.

U.S. Pat. No. 5,124,217 to Gruber et al. discloses a secure printing toner for electrophotographic printing. When exposed to toluene, a popular solvent often used in document forgery, the toner produces a color stain indicating an attempted forgery.

U.S. Pat. No. 7,220,524 to Heilman et al. discloses a color penetrating toner usable in laser printers. The toner is typically used with a substrate having a special coating for aiding penetration. After penetration, the toner printed images are difficult to remove.

There is a need for a relatively inexpensive penetrating ink usable in an inkjet printer that provides desirable penetration characteristics for providing the extra security features for the documents.

SUMMARY OF THE INVENTION

An aqueous penetrating ink having two colorants, a pigment and a water-soluble dye, a humectant in which the water-soluble dye is to be at least partially dissolved and water provides a security ink usable in inkjet printers.

The amount of humectant used is between 20 percent by weight and 70 percent by weight. The selected humectant provides a relatively slow evaporation of the solvent mixture of humectant and water. The pigment does not dissolve in the humectant or water. A significant portion of the pigment will not penetrate a substrate and will form an image on the printed side of the substrate. The slow evaporation rate of the solvent mixture allows it to carry the dye into the substrate. After this migration, the dye forms an image on the non-printed side of the substrate.

A pigment dispersion having a desirable particle size is the first step in the process of making the ink. The dye, humectant, water and pigment dispersion are admixed. The ingredients may be added one at a time. The result is a security ink according to the present invention.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
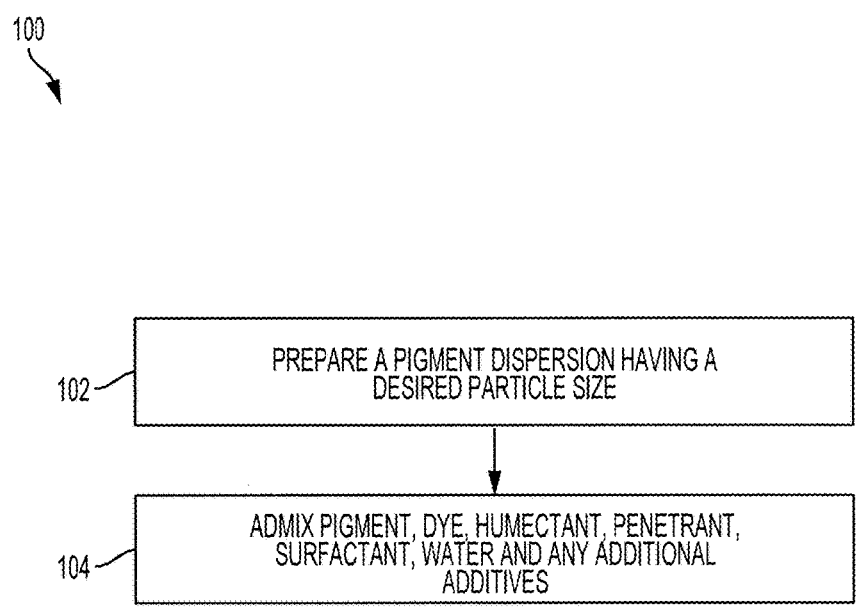
FIG. 1 is a block diagram illustrating a preferred method for making an aqueous penetrating inkjet ink.

The inventors discovered how to make a relatively inexpensive ink for an inkjet printer that provides desirable penetration characteristics. The ink is water based and no coating is required for migration of the dye. The dye migrates through the substrate immediately after printing.

The inkjet ink includes two types of colorant, a pigment and a water-soluble dye. The color of the pigment and the color of the dye may be the same, or they may be different. The ink also contains a slow-drying humectant into which the dye dissolves. When printed onto a porous substrate, such as paper, the pigment forms an image on the printed side of the substrate. The pigment does not dissolve in the humectant so it remains at the surface of the substrate. The humectant carries the dissolved dye through the substrate. Eventually the humectant and the dye penetrate far enough through the substrate that the dye forms an image on the opposite, non-printed side.

The security feature of the penetrating ink can be increased by using ultraviolet-responsive dye. After penetration, the ultraviolet dye can appear colorless or colored on the non-printed side of the substrate. However, when the non-printed side is illuminated using ultraviolet light, the dye fluoresces. The authenticity of the document can be verified by comparing the fluorescing image with the pigment-based image.

The inkjet ink can also include one or more of a penetrant or a surfactant, and may also include any other known additives such as biocides, fungicides, bactericides, anti-curling agents, anti-bleed agents, anti-kogation agents, surface tension modifiers or buffers.

Preferred dyes for use in the ink exhibit a strong color absorbance through the substrate, good solubility in the selected humectant or humectants, good stability in the final ink and are indelible. The dye may or may not be ultraviolet-responsive. By way of example, suitable ultraviolet-responsive dyes include Acid Red 52, Basic Red 14, Basic Red 15, Acid Yellow 73, Direct Yellow 96, Basic Yellow 40 and Direct Yellow 73. By way of further example, suitable non-fluorescent dyes include Acid Red 1, Acid Red 14, Acid Red 88, Basic Red 18, Basic Violet 1, Basic Violet 3, Direct Red 31, Direct Red 23, Reactive Red 2, Reactive Red 11, most Acid Yellow and Acid Blue dyes, most Direct Yellow and Direct Blue dyes, most Basic Yellow and Basic Blue dyes and most Reactive Yellow and Reactive Blue dyes.

The pigment may be a pigment dispersion. Pigment dispersions are well known in the art and will not be described herein. It is desirable for the particles of the pigment in the pigment dispersion to be small enough to freely flow through the nozzles of inkjet printers. Typical inkjet printer nozzles have diameters between ten micrometers (10 microns) and 50 microns, and most nozzles have diameters that are smaller than 30 microns. The particle size of the pigment is preferably also selected to maintain stability of the pigment in the ink. Thus, smaller particles are preferred over larger particles. By way of example, a suitable pigment size is between 200 nanometers (nm) and 20 microns, and preferably between 100 nm and 20 microns.

Exemplary pigments include carbon black, organic and inorganic color pigments, magnetic iron oxide, composite black consisting of color pigments including azo pigments such as condensed and chelate azo pigments; polycyclic pigments such as phthalocyanines, anthraquinones, quinacridones, thioindigoids, isoindolinones, and quinophthalones; nitro pigments; daylight fluorescent pigments; carbonates; chromates; titanium oxides; zinc oxides; magnetic iron oxides and carbon black. Preferred pigments include carbon black, magnetic iron oxide and the pigments capable of generating a cyan, magenta and yellow ink. By way of example, suitable pigments include carbon black, magnetic iron oxide, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3.

Evaporation rates of materials are not typically measured. Boiling points of materials, however, are well known and correspond to evaporation rates. In particular, higher boiling points typically correspond to slower rates of evaporation. Water, for example, has a boiling point of one hundred degrees Celsius (100° C.) and Ethylene Glycol has a boiling point of 197° C. Based on the boiling points, it is known that water evaporates faster than Ethylene Glycol.

The types and amounts of humectants should be selected to achieve a desired boiling point of the solvent mixture (the combination of humectants and water). In particular, the boiling point of the solvent mixture should be high enough to allow penetration of the dye through the substrate and low enough to minimize any blurring or bleeding caused by over migration of the dye.

The boiling point of the solvent mixture should be greater than 100° C. (the boiling point of water). By way of example, suitable boiling points of the solvent mixture are between 100° C. and 400° C., or between 150° C. and 400° C., or between 175° C. and 400° C., or between 200° C. and 400° C.

In order to achieve the desired solubility and evaporation characteristics, the total amount of non-water humectants in the penetrating inkjet ink should be between 20% and 70% by weight, or between 30% and 65% by weight, or between 45% and 70% by weight.

Table 1 below shows boiling points and solubility of dyes in three exemplary humectants. The solubility was tested by dissolving one and a half grams (1.5 g) of dye into 6 g of each corresponding solvent.

| Solvent | Boiling Point (° C.) | Solubility of Acid Red 52 | Solubility of Basic Red 14 | Solubility of Basic Red 15 |
| --- | --- | --- | --- | --- |
| Water | 100 | Soluble | Soluble | Soluble |
| Dowanol PM Glycol Ether | 120 | Soluble | Insoluble | Partially Soluble |
| Ethylene Glycol | 197 | Soluble | Soluble | Soluble |
| 1-Methoxy-2-Propanol | 118.5 | Soluble | Insoluble | Partially Soluble |
| Hexyl Carbitol | 259 | Soluble | Insoluble | Partially Soluble |
| Di(Ethylene Glycol) Ethyl Ether | 185 | Soluble | Insoluble | Insoluble |
| 2-Pyrrolidinone | 245 | Soluble | Soluble | Soluble |
| 1,3-Propanediol | 214 | Partially Soluble | Partially Soluble | Partially Soluble |
| 1,5-Pentanediol | 242 | Partially Soluble | Partially Soluble | Insoluble |
| Dowanol PPH Glycol Ether | 241 | Partially Soluble | Partially Soluble | Insoluble |
| Triethylene Glycol | 285 | Partially Soluble | Partially Soluble | Partially Soluble |
| Glycerol | 290 | Partially Soluble | Partially Soluble | Insoluble |
| 1-(2-Hydroxyethyl)-2-Pyrrolidone | NA | Partially Soluble | Partially Soluble | Partially Soluble |
| 1,2-Hexanediol | 224 | Insoluble | Partially Soluble | Insoluble |

1.5 g dye in 6 g of solvent

The humectant carries the dye. Together they migrate through the porous substrate. The ink may include more than one humectant and includes water. The humectants should be selected so that the dye is at least partially soluble in each. Any humectants can be used, as long as the dye is fully soluble in the solvent mixture that includes the humectants and water.

The humectant should have an evaporation rate that is slow enough for the humectant to migrate through the thickness of the substrate before drying. However, if the humectant evaporates too slowly, it will not stop migrating after it reaches the non-printed side of the substrate. This over-migration can result in blurred images and bleeding of the dye from the substrate. The evaporation rate of the humectant must be slow enough to allow penetration through the substrate and fast enough to prevent over-migration.

Each of the humectants has a greater boiling point than water. Based on the boiling points and the solubility of Acid Red 52, suitable humectants include 2-pyrrolidone; Dowanol™ PM Glycol Ether; Di(Ethylene Glycol) Ethyl Ether; Ethylene Glycol; 1-Methoxy-2-Propanol; and Hexyl Carbitol. 1,3-Propanediol; 1,5-Pentanediol; Dowanol™ PPH Glycol Ether; Triethylene Glycol; Glycerol; and 1-(2-Hydroxyethyl)-2-Pyrrolidone can also be used with Acid Red 52 provided that Acid Red 52 is soluble in the final solvent mixture of humectants and water.

Use of a penetrant is preferred, but optional. It is typically preferred to include one or more penetrants because they aid in migration of the dye. Exemplary penetrants include 1, 2 C1-C6 alkyl diols such as 1,2 hexanediol, N-propanol, isopropanol and hexyl carbitol. By way of example, the penetrant is present between 0.1% and 10% by weight.

Surfactants are preferred. Surfactants modify the surface tension and/or the viscosity of the penetrating ink. The surfactants are used to adjust the jettability and the wetting characteristics of the ink and help the ink penetrate through the substrate. The ink should include only the minimum amount of surfactants necessary to achieve reliable jetting, wetting and penetrating especially when a pigment dispersion is used. Polymeric dispersants are located on the surface of the pigment particles. Surfactants typically have a low molecular weight and may attack polymeric dispersants. When more than the minimum amount of surfactants is used, the surfactants will cause instability of the dispersion. In order to achieve the desired jettability, the amount of total surfactants in the penetrating ink should be between 0% and 2% by weight, or between 0.01% and 2% by weight, or between 0.1% and 2% by weight.

Non-ionic surfactants are preferred. Exemplary surfactants include fluorosurfactants, such as Capstone® surfactants, available from DuPont of Wilmington, Del., APFS® surfactants, available from Advanced Polymer, Inc. of Carlstadt, N.J., Chemguard®, available from Chemguard Inc. of Mansfield, Tex., Nevec, available from 3M of St. Paul, Minn.; alkylaryl polyether alcohol non-ionic surfactants, such as octylphenoxy-polyethoxyethanol, available from Dow Chemical Company of Midland, Mich. under the trade name TRITON®; alkylamine ethoxylates non-ionic surfactants, available from Dow Chemical Company of Midland, Mich. under the trade name TRITON® including TRITON® CF-10 and under the trade name TERGITOL®; ethoxylated acetylenic diol surfactants, available from Air Products and Chemicals, Inc. of Allentown, Pa. under the trade names SURFYNOL® and Dynol®; polysorbate products, available from ICI Chemicals & Polymers Ltd. of Middlesborough, UK under the trade name TWEEN®; polyalkylene and polyalkylene modified surfactants, available from Crompton OSI Specialties of Greenwich, Conn., under the trade name SILWET®; polydimethylsiloxane copolymers and surfactants, available from Momentive Performance Materials Inc. of Waterford, N.Y. under the trade name COATOSIL®; alcohol alkoxylates nonionic surfactants, available from Uniqema of New Castle, Del., under the trade names RENEX®, BRIJ®, and UKANIL®; sorbitan ester products, available from Omya Peralta GmbH of Hamburg, Germany under the trade names SPAN® and ARLACEL®; alkoxylated esters/polyethylene glycol surfactants, available from ICI Chemicals & Polymers Ltd. of Middlesborough, UK under the trade names TWEEN®, ATLAS®, MYRJ® and CIRRASOL®; alkyl phosphoric acid ester surfactant products such as amyl acid phosphate, available from Chemron Corporation of Paso Robles, Calif., under the trade name CHEMPHOS® TR-421; alkyl amine oxides, available from Chemron Corporation of Paso Robles, Calif. under the trade name CHEMOXIDE®; anionic sarcosinate surfactants, available from Hampshire Chemical Corporation of Nashua, N.H. under the trade name HAMPOSYL®; glycerol esters or polyglycol ester nonionic surfactants, available from Calgene Chemical Inc. of Skokie, Ill. under the trade name HODAG®, available from Henkei-Nopco A/S of Drammen, Norway under the trade name ALPHENATE®, available from Hoechst AG of Frankfurt, Germany under the trade name SOLEGAL® W, and available from Auschem SpA of Milan, Italy under the trade name EMULTEX®; polyethylene glycol ether surfactants, available from Takemoto Oil and Fact Co. Ltd. of Japan under the trade name NEWKALGEN®; modified poly-dimethyl-silicone surfactants, available from BYK Chemie of Wesel, Germany under the trade name BYK® 300; and other commercially available surfactants known to those skilled in the art.

The penetrating ink may also include other additives known in the art. These additives may be chelating agents, buffers, biocides, fungicides, bactericides, anti-curling agents, anti-bleed agents, anti-kogation agents, surface tension modifiers or buffers. Acceptable biocides include benz-isothiazolin-one, methyl-isothiazolin-one, chloro-methyl-isothiazolin-one, sodium dihydroacetate, sodium sorbate, sodium 2-pyridinethiol-1-oxide, sodium benzoate and sodium pentachlorophenol. By way of example, the biocide may include Zolidine™, available from The Dow Chemical Co. of Midland, Mich.; Proxel™, available from Lonza of Basel, Switzerland; Kordek™, available from The Dow Chemical Co. of Midland, Mich.; Givguard™, available from The Dow Chemical Co. of Midland, Mich.; and Kathon® PFM, available from The Dow Chemical Co. of Midland, Mich.

Turning to FIG. 1, a method 100 for preparing an aqueous penetrating inkjet ink is shown. The method begins with preparing a pigment dispersion in step 102. The pigment dispersion typically includes pigment particles, dispersants, solvents and water. The ingredients are pre-mixed and then moved to a mill. The mixture is milled until the desired particle size is achieved.

The pigment or pigment dispersion, the dye, the humectant, the penetrant, the surfactant, the water and any additional additives are admixed together in step 104. The ingredients may be introduced one by one and mixed for a period of time before adding another ingredient. The period of time between adding ingredients may be between 3 and 20 minutes, or between 5 and 15 minutes. An exemplary admixing step begins with admixing the pigment and the water. After 10 minutes or so, the humectant is then admixed to the water and pigment, and so forth.

After all ingredients have been admixed, the pH of the solution is adjusted to a value between 6.5 and 9.

Table 2 below illustrates compositions of 9 aqueous penetrating inkjet inks according to the present invention. The given values are percentage of the ingredient by weight in the final aqueous penetrating inkjet ink.

| Ingredient | Example 1 | Example 2 | Example 3 | Example 4 | Example 5 | Example 6 | Example 7 | Example 8 | Example 9 |
|---|---|---|---|---|---|---|---|---|---|
| Carbon black | 3.5 | 3.0% | 3.0% | 3.0% | 3.0% | 3.0% | 3.0% | 3.0% | 3.0% |
| Acid Red 52 | 0.0% | 0.5% | 0.5% | 0.5% | 0.5% | 0.5% | 0.5% | 0.5% | 0.0% |
| Basic Yellow 40 | 0.0% | 0.0% | 0.0% | 0.0% | 0.0% | 0.0% | 0.0% | 0.0% | 0.5% |
| Humectant 1 | 12.0% | 12.0% | 20.0% | 20.0% | 36.0% | 36.0% | 36.0% | 36.0% | 36.0% |
| Humectant 2 | 0.0% | 0.0% | 0.0% | 16.0% | 30.0% | 30.0% | 30.0% | 30.0% | 30.0% |
| Humectant 3 | 8.0% | 8.0% | 10.0% | 0.0% | 0.0% | 0.0% | 0.0% | 0.0% | 0.0% |
| Penetrant | 2.0% | 2.0% | 3.0% | 0.0% | 0.0% | 2.0% | 2.0% | 2.0% | 2.0% |
| Dynol 604 | 0.8% | 0.8% | 0.8% | 0.8% | 0.8% | 0.0% | 0.0% | 0.0% | 0.0% |
| APFS-14 | 0.0% | 0.0% | 0.0% | 0.0% | 0.0% | 0.2% | 0.0% | 0.0% | 0.0% |
| BYK-348 | 0.0% | 0.0% | 0.0% | 0.0% | 0.0% | 0.0% | 0.5% | 0.0% | 0.0% |
| TegoWet 270 | 0.0% | 0.0% | 0.0% | 0.0% | 0.0% | 0.0% | 0.0% | 0.3% | 0.3% |

-continued

| Ingredient | Example 1 | Example 2 | Example 3 | Example 4 | Example 5 | Example 6 | Example 7 | Example 8 | Example 9 |
|---|---|---|---|---|---|---|---|---|---|
| Biocide | 0.15% | 0.15% | 0.15% | 0.15% | 0.15% | 0.15% | 0.15% | 0.15% | 0.15% |
| D.I. Water | Balanced | Balanced | Balanced | Balanced | Balanced | Balanced | Balanced | Balanced | Balanced |

Humectant 1 in the examples is 2-Pyrrolidinone. However, any humectant having a boiling point above 200° C. and in which the dye is at least partially soluble can be used in place of the 2-Pyrrolidinone to achieve similar results.

Humectant 2 in the examples is Dowanol™ PM Glycol Ether. However, any humectant in which the dye is highly soluble can be used in place of the Dowanol™ PM Glycol Ether to achieve similar results. High solubility corresponds to the dye being soluble per Table 1.

Humectant 3 in the examples is 1-methoxyl-2-propanol. Humectant 3 is used to adjust the jetting characteristics of the ink. Any other humectant can be used in place of 1-methoxyl-2-propanol, such as a glycol, a diol or a triol, in order to achieve the desired jettability.

The penetrant in the examples is 1,2 hexanediol. Any other penetrant can be used in place of the 1,2 hexanediol, such as a 1,2 C1-C6 alkyl diol.

The above aqueous penetrating inkjet inks were evaluated in an HP Officejet 100 mobile printer, available from Hewlett-Packard, Inc. of Palo Alto, Calif. The inks were printed on non-fluorescent (UV dull) paper. Table 3 below shows the results of printing each of the penetrating inks of Table 2.

| Property and Performance | Example 1 | Example 2 | Example 3 | Example 4 | Example 5 | Example 6 | Example 7 | Example 8 | Example 9 |
|---|---|---|---|---|---|---|---|---|---|
| Surface Tension (dyne/cm) | 27.3 | 27.5 | 28.9 | 26.3 | 35.5 | 29.3 | 24.5 | 21.3 | 21.5 |
| Strenght of visible Red Color on Back Side | 1 | 2.5 | 3.0 | 3.5 | 4.0 | 4.0 | 4.5 | 5.0 | 5.0 |
| Strenght of UV fluorescent Red Color on Back Side | 1 | 2.5 | 3.0 | 3.5 | 4.0 | 4.0 | 4.5 | 5.0 | 5.0 |

The intensity of the red or yellow color and the fluorescence of the dye on the non-printed side of the paper were visually rated from 1 (weak) to 5 (strong). The results show that increased amounts of humectant 2 (in which the dye is highly soluble) increased both the color intensity and the strength of the fluorescence on the non-printed side of the paper. The results also show that use of surfactants having high wettability properties increased both the color intensity and the strength of the fluorescence on the non-printed side of the paper.

Figure 2:
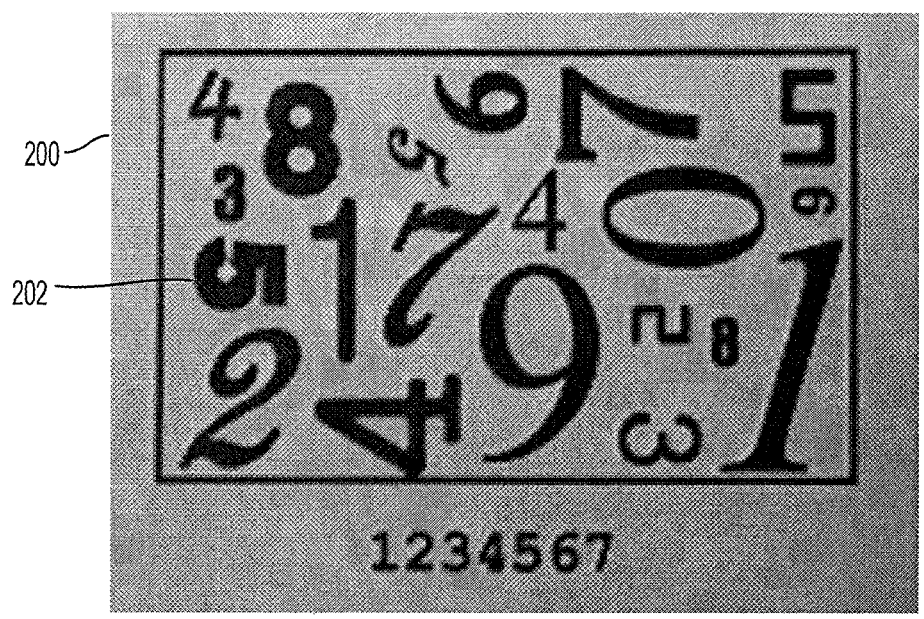
FIG. 2 is a picture of a side of a substrate onto which the aqueous penetrating inkjet ink of FIG. 1 was printed.
Figure 3:
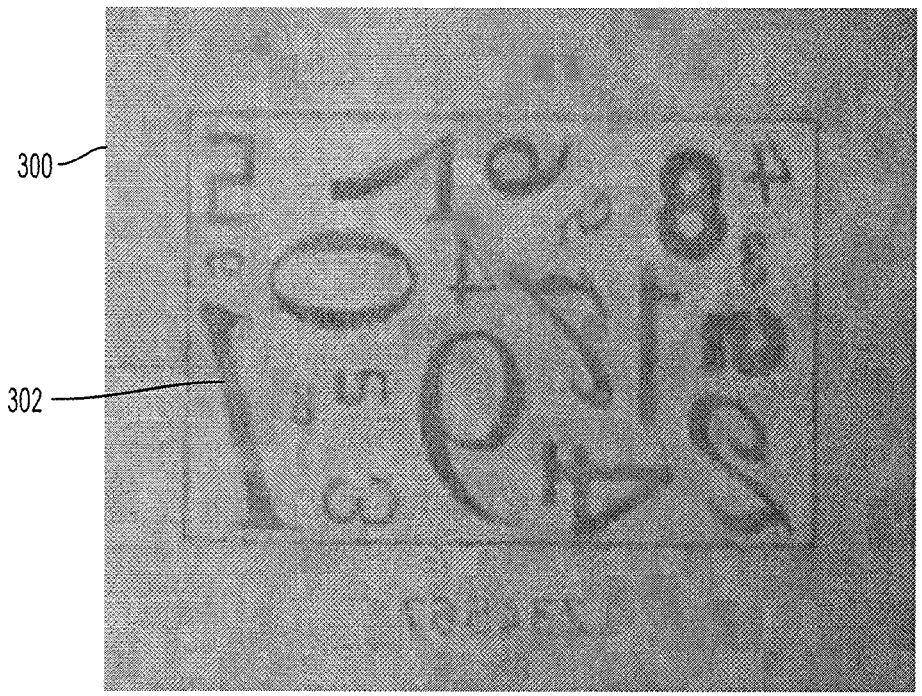
FIG. 3 is a picture of the non-printed side of the substrate of FIG. 2 showing the penetration of the aqueous penetrating inkjet ink.

Turning now to FIGS. 2 and 3, front and back views of a document printed using the ink composition of example 8 are shown. In particular, FIG. 2 shows the printed side 200 of a document. FIG. 3 shows the non-printed side 300 of the document. The color of the pigment 202 on the printed side 200 is intense and the clarity of the text is clear. On the non-printed side 300, the color of the Acid Red 52 dye is intense and the clarity of the text is clear.

What is claimed is:

1. An aqueous penetrating ink comprising:
    a pigment dispersion not soluble in water, having particle size between 200 nm and 20 µm containing at least one of carbon black, magnetic iron oxide and a color pigment;
    a solution of water and humectant, the humectant present in an amount between 20 percent to 70 percent by weight of the aqueous penetrating ink, the humectant and water solution having a boiling point between 100 degrees and 400 degrees Celsius, wherein the humectant is a higher total weight than the water weight in the humectant and water solution; and
    a dye dissolved in the humectant and water solution, wherein the dye is humectant and water soluble;
    whereby when the aqueous penetrating ink is used to print an image on paper by an inkjet printer, the pigment-formed image remains on a printed-on side of the paper, while the dye dissolved in the humectant and water solution migrates through the paper to the opposite side before drying.

2. The aqueous penetrating ink of claim 1 wherein the humectant includes two humectants, each humectant having a boiling point above 200 degrees Celsius and wherein the dye is soluble in the two humectants.

3. The aqueous penetrating ink of claim 2 further comprising a third humectant that is a glycol, a diol or a triol for adjusting jetting characteristics of the aqueous penetrating ink.

4. The aqueous penetrating ink of claim 1 wherein the humectant includes at least two of 2-pyrrolidone, propylene glycol methyl ether, Di(Ethylene Glycol) Ethyl Ether, Ethylene Glycol, Hexyl Carbitol, 1,3-Propanediol, 1,5-Pentanediol, propylene glycol phenyl ether, Triethylene Glycol, Glycerol, or 1-(2-Hydroxyethyl)-2-Pyrrolidone.

5. The aqueous penetrating ink of claim 1 wherein the water and the humectant combined have a boiling point that is greater than 150 degrees Celsius.

6. The aqueous penetrating ink of claim 1 further comprising a penetrant present in an amount between 0.1 percent and 10 percent by weight of the aqueous penetrating ink.

7. The aqueous penetrating ink of claim 1 further comprising a surfactant present in an amount between 0.1 percent and 2 percent by weight of the aqueous penetrating ink.

8. The aqueous penetrating ink of claim 1 wherein the dye includes at least one of an ultraviolet-responsive dye or a non-fluorescent dye.

9. The aqueous penetrating ink of claim 1 wherein the humectant is present in an amount between 30 percent by weight and 65 percent by weight of the aqueous penetrating ink.

10. A method for making an aqueous penetrating ink comprising:

preparing a pigment dispersion not soluble in water having a particle size between 200 nm and 20 μm containing at least one of carbon black, magnetic iron oxide and a color pigment;

milling the pigment dispersion until a desired particle size is achieved; and admixing a water and humectant soluble dye, water and one or more humectants, the humectant present at between 20 and 70 percent by weight of the aqueous penetrating ink with the pigment dispersion, the humectant and water solution in the admix having a boiling point between 100 degrees to 400 degrees Celsius, wherein the humectant is a higher total weight than the water weight in the humectant and water solution.

11. The method of claim 10 wherein admixing one or more humectants comprises admixing a first humectant that has a boiling point above 200 degrees Celsius.

12. The method of claim 10 wherein the amount and type of the one or more humectants are such that the one or more humectants and the water combined have a boiling point greater than 175 degrees Celsius.

13. The aqueous penetrating ink of claim 1 wherein the pigment dispersion has a particle size of less than 1 μm.

14. The aqueous penetrating ink of claim 1 further comprising a surfactant present in an amount between 0.01% by weight and 2% by weight of the aqueous penetrating ink.

15. The aqueous penetrating ink of claim 1 wherein the dye includes at least one Acid Red 52, Basic Red 14, Basic Red 15, Acid Yellow 73, Direct Yellow 96, Basic Yellow 40 and Direct Yellow 73, Acid Red 1, Acid Red 14, Acid Red 88, Basic Red 18, Basic Violet 1, Basic Violet 3, Direct Red 31, Direct Red 23, Reactive Red 2, and Reactive Red 11.

16. The aqueous penetrating ink of claim 1 wherein the color pigment includes at least one composite black, polycyclic pigments, nitro pigments, daylight fluorescent pigments, carbonates, chromates, titanium oxides, zinc oxides, Pigment Red 81, Pigment Red 122, Pigment Yellow 13, Pigment Yellow 14, Pigment Yellow 17, Pigment Yellow 74, Pigment Yellow 83, Pigment Yellow 128, Pigment Yellow 138, Pigment Orange 5, Pigment Orange 30, Pigment Orange 34, Pigment Blue 15:4 and Pigment Blue 15:3.

* * * * *